United States Patent [19]

Kennedy, Jr.

[11] 4,378,290
[45] Mar. 29, 1983

[54] MODULARIZED MULTI-STAGE SEPARATOR SYSTEM

[76] Inventor: Alvin B. Kennedy, Jr., P.O. Box 282, Angleton, Tex. 77515

[21] Appl. No.: 283,061

[22] Filed: Jul. 16, 1981

[51] Int. Cl.³ .......................................... B01D 21/26
[52] U.S. Cl. .................. 210/103; 210/112; 210/120; 210/241; 210/258; 210/260; 210/261; 210/512.2; 210/512.3; 137/519.5; 209/17; 209/211; 55/206
[58] Field of Search ............... 209/17, 211; 210/787-789, 103-105, 109, 112-115, 120, 180, 241, 258, 259, 260, 261, 262, 416.1, 456, 512.1, 512.2, 512.3, 107, 169; 137/204, 519.5; 55/199, 206

[56] References Cited

U.S. PATENT DOCUMENTS

| | | | |
|---|---|---|---|
| 2,109,269 | 2/1938 | Kohut | 137/204 |
| 3,289,775 | 12/1966 | Stone | 175/66 |
| 3,616,917 | 11/1971 | Hellwege | 210/167 |

Primary Examiner—Ernest G. Therkorn
Attorney, Agent, or Firm—Guy E. Matthews

[57] ABSTRACT

A mobile, self-contained, self-powered three stage apparatus is disclosed for separating solids from a liquid. Three stack separator pods are mounted over a housing on a mobile platform. A plurality of hydrocyclones are readily mounted with respect to the separator pods to provide for separating the solidds therewithin. Each successive separator pod contains a greater number of smaller diameter hydrocyclone so as to enable the separation of smaller diameter of particles. Each separator pod also includes degassing capabilities. A plurality of holding tanks act as reservoirs for the fluid and solid mixture prior to and subsequent to each separator pod. A system of internal weirs allows overflow of liquids from a holding tank containing cleaner mixture to a holding tank containing a greater proportion of solids, whereby liquid equilibrium is maintained within the system.

23 Claims, 4 Drawing Figures

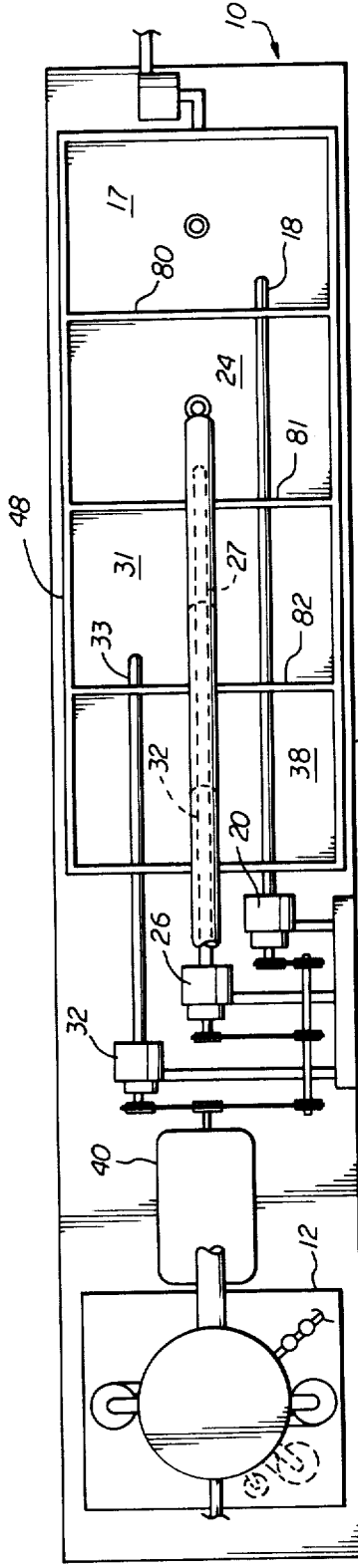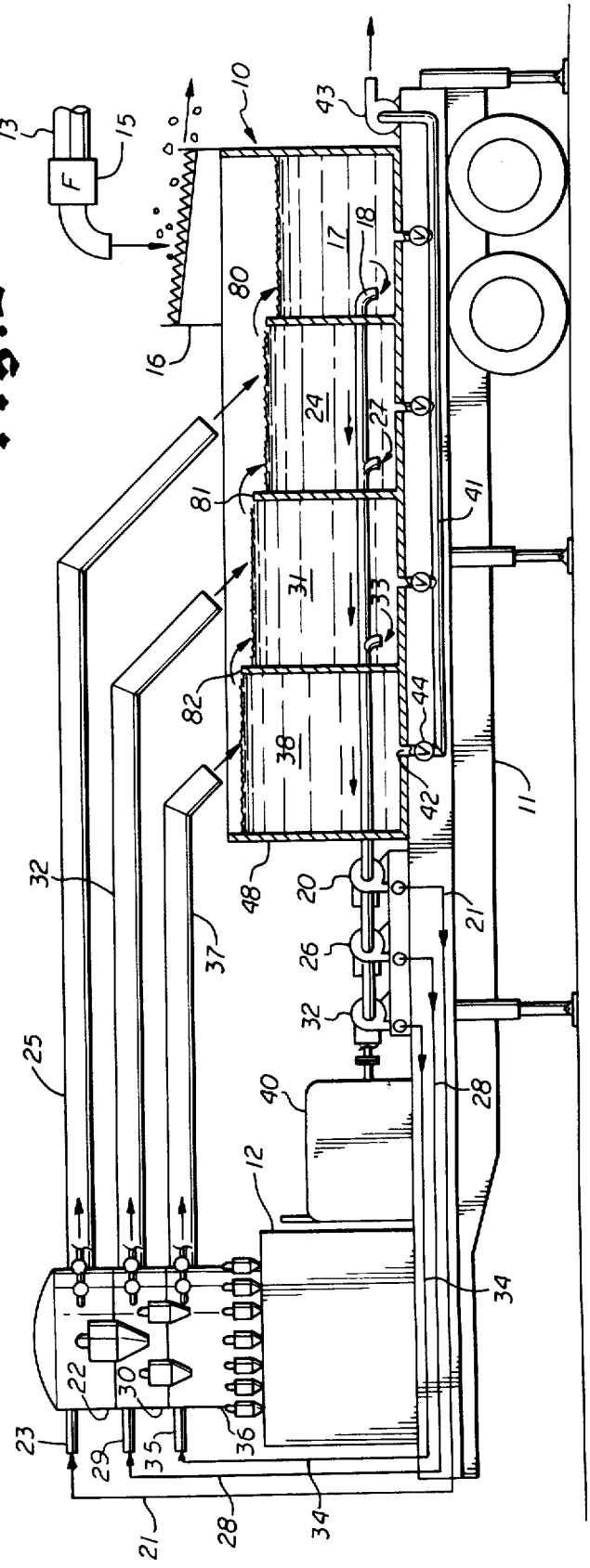

MODULARIZED MULTI-STAGE SEPARATOR SYSTEM

FIELD OF THE INVENTION

The present invention relates generally to an apparatus for separating fluids and solids. Specifically, the present invention relates to a multi-stage, self-contained, mobile system for removing solids from a fluids.

BACKGROUND OF THE INVENTION

There are numerous situations and processes in which liquids accumulate or become contaminated with sediments of various types. Examples of various contaminated liquids are discussed at length in allowed copending U.S. patent application Ser. No. 240,418, filed Mar. 4, 1981, which discloses an apparatus and method for cleaning such liquids. The system of the Ser. No. 240,418 application includes a plurality of hydrocyclone runs wherein suspended particles of successively smaller size are removed in each run. The solids are collected from each hydrocyclone run in separate waste collection receptacles for further processing or disposal.

The system of the Ser. No. 240,418 application is very effective and is a substantial advance in the art. However, that system is not without drawbacks. The primary shortcoming of the prior system is in the separate and remote locations of the hydrocylone banks, which causes the system to be bulky and somewhat complex. Also, the separate hydrocyclone banks dump into separate waste receptacles, which increases the bulk and cumbersomeness of the system. A further shortcoming of the prior system is inherent in the nature of all separators that include hydrocyclones. In order for a hydrocyclone to work properly, there must be substantially no gas entrained in the liquid. The presence of entrained gas causes the liquid to become somewhat compressible, which diminishes the efficiency of the hydrocyclone. In the prior system, no means or removing gas from the liquid was provided.

It is therefore an object of the present invention to provide a system for separating solids from fluids that overcomes the shortcomings of the prior art.

It is a further object of the present invention to provide a multistage hydrocyclone separator system that is arranged to discharge removed solids into a common receptacle.

It is a further object of the present invention to provide a hydrocyclone separator system that removes entrained gases from the liquid prior to an entry into the hydrocyclone devices.

It is a further object of the invention to provide a separating system that is self-contained and self-powered.

SUMMARY OF THE INVENTION

Briefly, stated, the foregoing and other objects of the present invention are accomplished by providing a system which includes a plurality of vertically stacked separating pods, wherein each successive pad is designed to separate increasingly smaller sizes of particulate contaminates while simultaneously degassing the liquid. Each separating pod includes an inner tank and an outer tank, and a plurality of hydrocyclones mounted thereabout to receive liquid from the inner tank and discharge liquid to the outer tank. Each successive separator pod includes an increasingly larger number of hydrocyclones of correspondingly decreasing size to remove successively smaller diameter particles. Separated solid materials are discharged into a common reservoir for further treatment or periodic disposal. Each pod includes an inlet conduit arranged to introduce liquid into the inner tank and an outlet conduit arranged to receive liquid from the outer tank.

Degassing is accomplished by impinging the incoming stream of liquid against an impingement plate located within the inner tank of each pod. When the pressure of gas within each pod exceeds a certain predetermined level, which may be measured by a gauge, the gas is vented. In order to prevent gas from being introduced into the liquid during the hydrocycloning, each hydrocyclone is provided with a valve which closes whenever the sub-atmospheric pressure exist at the apex of the hydrocyclone.

A plurality of holding tanks are provided as intermediate reservoirs and are connected to the inlet and outlet conduits of successive separating pods. Pumps are provided for transferring liquid from the holding tanks to the inlet conduits. The holding tanks are constructed adjacent one another in linear alignment. A series of weirs are formed in the tanks whereby overflow water is allowed to pass from one tank to another to maintain a balanced fluid system during operation. Each holding tank includes a drain which enables the holding tanks to be emptied.

BRIEF DESCRIPTION OF THE DRAWINGS

FIG. 1 is a partially schematic side view of the apparatus of the present invention.

FIG. 2 is a partially schematic top view of the apparatus of the present invention.

DESCRIPTION OF THE PREFERRED EMBODIMENT

Figure 3:
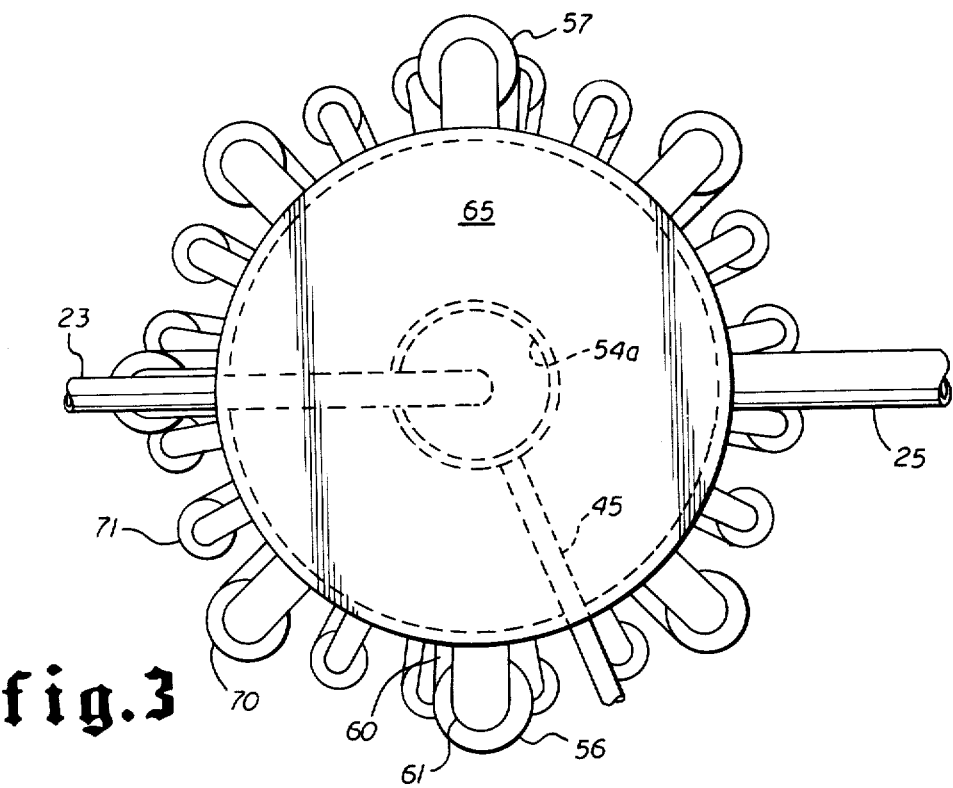
FIG. 3 is a top view of the separator of the present invention.

Referring now to the drawing, and first to FIGS. 1 and 2, the numeral 10 generally indicates the separator apparatus as herein described. Apparatus 10 may be mounted on a mobile platform 11 such as a semi-trailer or the like, in order that apparatus 10 may be readily transported from site to site. The incoming fluid and solid mixture may be transported to the apparatus through a conduit 13 by means of a pump (not shown). In order to prevent possible damage or clogging of the apparatus the incoming mixture may be passed through a filtration unit 15 and/or a vibrating screen 16 as is well known in the art so as to eliminate any large particles from the mixture. The filtered mixture is then deposited in a primary holding tank 17.

From the primary holding tank 17, the mixture is pumped through a conduit 18 by a first pump 20. Conduit 18 has a downturned suction end positioned near the bottom of holding tank 17 to allow for substantially complete removal of the mixture. First pump 20 injects the mixture through a hose represented by the numeral 21 into a primary separator pod 22 through an inlet conduit 23. Within primary separator pod 22 the mixture is degassed and particles above a certain size are removed in an operation which will be discussed in more detail hereafter. The resulting primarily separated mixture is then discharged from primary separator pod 22 into a secondary holding tank 24 by means of a primary return line 25, which is gravity flow line communicating between the primary separator pod 21 and secondary holding tank 24.

The primarily separated mixture is then withdrawn from secondary holding tank 24 by means of a second pump 26 through a conduit 27. The discharge of pump 26 is connected to a hose represented by the numeral 28 which in turn is connected to an inlet conduit 29 of a secondary separator pod 30 mounted below primary separator pod 22. Within secondary separator pod 30, the mixture is again degassed and particles above a second smaller predetermined size are removed. The resulting secondarily separated mixture is then similarly discharged to a tertiary holding tank 31 through a secondary gravity flow return line 32.

In the preferred embodiment of the invention, the separation process is then repeated once more by a means of a third pump 32 which draws the secondarily separated mixture out of the tertiary holding tank 31 through a conduit 33. The discharge of pump 32 is connected to a hose 34, which inturn is connected to an inlet conduit 35 of a tertiary separator pod 36 mounted below secondary separator pod 30, in which the mixture is again degassed and very find solids are removed. The processed mixture is then discharged through an outlet conduit 37 to a final holding tank 38.

In the preferred embodiment of the invention, it will be noted that pumps 20, 26 and 32 may be operated by an engine 40 mounted adjacent thereto, and power transmitted to the pumps, as is well known in the art, by a system of pulleys and belts.

The separated solids, or sludge, from separator pods 22, 30 and 36 is deposited in a common sludge reservoir 12, overwhich the separator pods are mounted. The contents of sludge reservoir 12 may be removed periodically for disposal or for further processing, as for example vibratory screening or centrifuging. It will be noted that a primary feature of the invention the separator pods are so adapted and constructed as to be stackable, one upon the other.

The fluid contents contained within the four holding tanks may be drained therefrom by means of a drainage line 41 which connects port holes, as for example port hole 42 in final holding tank 38. A drainage pump 43 is connected to drainage line 41 to assist in draining the holding tanks and to pump clean liquid from final holding tank 38 to various locations. Further, each port hole is controlled by a valve, as for example valve 44, whereby each holding tank may be drained individually or simultaneously by controlling each valve. The processed fluid in final holding tank 38 is removed for reuse or further processing by opening valve 44 and, if necessary, energizing pump 43.

The holding tanks may be individual structures if desired, but in the preferred embodiment takes the form of a four compartment tank 48. Tank 48 includes intermediate partitions 80, 81 and 82 that cooperate to define the holding tanks. Intermediate partitions 80, 81, and 82 are formed to define internal weirs, that are so designed that the mixture flow in the system 10 is balanced. Any excess mixture within final holding tank 38 will flow into the upper portion of tertiary holding tank 31. Likewise, excess secondarily separated liquid within holding tank 31 will flow into holding tank 24, and excess primarily separated liquid in holding tank 24 will flow into holding tank 17, thereby creating a system of flow which is integrally balanced in volume of liquid flow. As can readily be observed, the weir system herein described contemplates that the overflow of the mixture will occur only towards a compartment of greater contamination.

Figure 4:
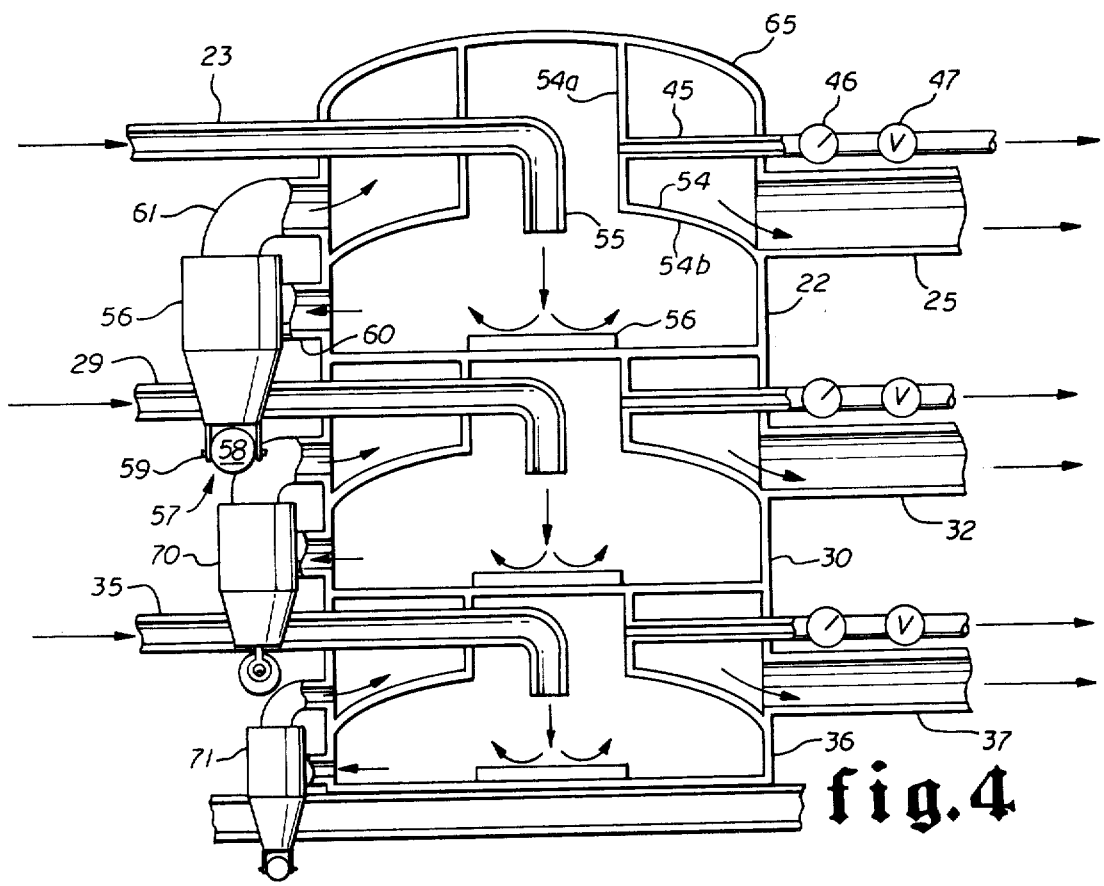
FIG. 4 is a simplified sectional view of the separator of the present invention.

Referring now to FIGS. 3 and 4, the detailed operation of the separator pods is shown. As was previously described, the mixture is introduced into each of the separator pods through a conduit. Referring to primary separator pod 22, the untreated mixture enters an inner pressure tank 54 through inlet conduit 23 which has a downwardly directed discharge opening 55. The mixture is forcibly discharged in a downward direction onto an impingement plate 56. The impact of the pressurized mixture on impingement plate 56 forces any entrained gas within the mixture to separate and collect in an upper portion 54a of the inner tank 54. The liquid and solid mixture is left in the lower portion 54b of inner tank 54b. The air and separated gas in upper portion 54a acts to pressurize the entire chamber. Collected air or gas may be vented by way of an air vent 45, controlled by a valve 47 and monitored a gauge 46. The pressure inner tank 54 forces the solid and liquid mixture to exit the inner tank 54 and enter a pair of primary hydrocyclones 56 and 57.

Primary hydrocyclone 56 is connected to inner tank 54 by a conduit 60. The fluid discharged from primary hydrocyclone 56 is connected through a discharge conduit 61 to an outer tank 65 mounted above lower portion 54b and around upper portion 54a of inner tank 54. The fluid thus collected in outer tank 65 is discharged from pod 22 through primary return line 25 for return to holding tank 24 as described above.

The operation of separating pods 30 and 36 is conducted similarly. However, each succeeding separator pod is designed to separate increasingly smaller particulate sizes. To this end, in the preferred embodiment of the invention, primary separator pod 22 is equipped with two diametrically opposed hydrocyclones 56 and 57, which are approximately ten inches in diameter and which are designed to separate particles larger than 50 microns. Secondary separator pod 30 is equipped with five radially mounted hydrocyclones, as for example hydrocyclone 70, which are approximately 5 inches in diameter and which are designed to separate particles greater than about 10 microns. Finally, tertiary separator rod 36 is equipped with 20 radially mounted hydrocyclones, as for example hydrocyclone 71, which are approximately 2 inches in diameter and which are designed to separate particles larger than 3 microns. Thus, the mixture is deposited within final holding tank 38 will be comprised of liquid from which substantially all particulate solids will have been eliminated.

It will be further noted that under certain conditions in the interior of the various hydrocyclones, sub-atmospheric pressures are sometimes created by the upward flow of the liquid toward the exhaust conduit. The sub-atmospheric pressures have a tendency to draw in the ambient atmosphere. This introduction is undesirable in that it may permit regassification of the liquid. To prevent this from happening, a valve is provided to control the inflow and outflow of material with respect to the interior of each hydrocyclone.

Referring to FIG. 4, hydrocyclone 56 includes a valve 57 which includes a ball valve element 58 which has a pair of projecting pins 59. A pair of inelastic hangers 60 have respective first ends mounted on the outside of hydrocyclone 56 and respective second ends forming loops which engage the pins 59 on the ball valve element 58. The rigid hangers 60 allow vertical movement of the ball valve element 58 with respect to the body of the hydrocyclone. When sub-atmospheric conditions exist within the hydrocyclone 56, the ball valve element 58 is induced upwards into contact with the outlet port of the hydrocyclone. The ball valve element 58 is so constructed as to provide sealing engagement with the outlet port when in contact therewith, so as to prevent the inflow of the ambient atmosphere. When the pressure inside the hydrocyclone 56 is equal to or greater than atmospheric pressure, no protection is necessary. The absence of suction allows the ball valve element 56 to rest in an open position and permits the outflow of solid materials from the interior of the hydrocyclone.

It should be understood by the reader hereof that the description of the invention herein is set forth for exemplary purposes only and that various changes and/or modifications may be made hereto without departing from the spirit and scope of the invention claimed hereafter.

Therefore that which is claimed and desired to be secured by United States Letters Patent is:

1. Apparatus for separating fluids and solids, which comprises:
a plurality of separator pods, each of said separator pods including a first tank having a fluid inlet, a second tank having a fluid outlet, and a hydrocyclone having a fluid inlet connected to said first tank, a fluid outlet connected to said outer tank, and a solids discharge outlet;
a common discharged solids reservoir positioned below said plurality of separator pods to receive solids discharged by said hydrocyclones;
a plurality of fluid holding tanks positioned adjacent said plurality of separator pods;
means for transferring fluid from a first of said fluid holding tanks to the fluid inlet of the first tank of a first of said separator pods;
means for transferring fluid from the fluid outlet of the second tank of said first separator pod to a second of said fluid holding tanks;
means for transferring fluid from said second fluid holding tank to the fluid inlet of the first tank of a second of said separator pods;
and means for transferring fluid from the fluid outlet of the second tank of said second separator pod to a third of said fluid holding tank.

2. The apparatus as claimed in claim 1, wherein said first and second tanks of said separator pods are mounted together with said second tank above said first tank.

3. The apparatus as claimed in claim 1, wherein said separator pods are stacked in vertical alignment over said common discharged solids reservoir.

4. The apparatus as claimed in claim 1, wherein the hydrocyclone of each of said separator pods is adapted to remove from the fluid solid particles of a different size.

5. The apparatus as claimed in claim 1, wherein the said hydrocyclone of the second separator pod is adapted to remove solid particles smaller than the particles removed by the hydrocyclone of the first separator pod.

6. The apparatus as claimed in claim 1, wherein said means for transferring fluid from said first holding tank to said first separator pod includes:
a first conduit having an end positioned adjacent the bottom of said first holding tank;
a pump having a suction connected to the other end of said first conduit;
and a second conduit connected between the discharge of said pump and the fluid inlet of the first tank of said first separator pod.

7. The apparatus as claimed in claim 1, wherein said means for transferring fluid from said first separator pod to said second fluid holding tank includes:
a gravity flow conduit having one end connected to the fluid outlet of said second tank of said first separator pod and the other end positioned to discharge fluid into said second fluid holding tank.

8. The apparatus as claimed in claim 1, including means for degassing the fluid prior to the entry of fluid into the hydrocyclone of said first separator pod.

9. The apparatus as claimed in claim 8, wherein said degassing means includes an impingement plate mounted within said first tank of said first separator pod and positioned for the impingement thereon of fluid discharged by said fluid inlet conduit.

10. The apparatus as claimed in claim 9, including means for venting pressure within said first tank of said first separator pod.

11. The apparatus as claimed in claim 1, wherein said fluid holding tanks are serially connected together.

12. The apparatus as claimed in claim 1, including a single tank having therein a plurality of partitions cooperating with said single tank to define said plurality of fluid holding tanks.

13. The apparatus as claimed in claim 12, wherein the partition defining said first fluid holding tank is lower than the partition defining said second fluid holding tank, whereby fluid from said second fluid holding tank may overflow into said first fluid holding tank.

14. The apparatus as claimed in claim 13, including:
means for transferring fluid from said second fluid holding tank to the fluid inlet of first tank of a third separator pod;
and means for transferring fluid from the fluid outlet of the second tank of the third separator pod to a fourth fluid holding tank.

15. The apparatus as claimed in claim 14, including means for removing fluid from said fourth fluid holding tank.

16. The apparatus as claimed in claim 15, wherein said removing means includes:
a port hole in the bottom of said fourth tank; and
drain line connected to said port hole;
and a valve for control the flow of fluid from said port hole into said drain line.

17. The apparatus as claimed in claim 16, including a pump connected to said drain line for pumping fluids from said drain line to remote locations.

18. The apparatus as claimed in claim 16, including: a drain in the bottom of each of said first, second and third fluid holding tanks, each of said drains including a drain conduit connected to said drain line and a valve in said drain conduit for isolating said drain from said drain line.

19. The apparatus as claimed in claim 1, including a trailer for supporting pod separators, solids reservoir and fluid holding tanks.

20. A modular apparatus for separating fluids and solids in a mixture, comprising:
(a) a holding tank for containing the mixture prior to separation;
(b) a first conduit having a first end inserted into the holding tank;

(c) a pump having a suction connected to the second end of said first conduit;

(d) a second conduit having a first end connected to the discharge of said pump;

(e) a separator pod connected to the other end of said second conduit, said separator including an inner pressure tank connected to the second conduit and an outer tank, a plurality of hydrocyclone separator means radially arranged about said separator pod and communicating with the inner pressure tank, said inner pressure tank containing degassing means, said hydrocyclone separating means including a first outlet for discharge of the separated solids and a second outlet for outflow of separated fluids, said second outlet communicating with said outer tank said outer tank a fluid outlet for transmission of the fluids contained therewithin to the exterior of the separator pod;

(f) a gas venting line communicating with the inner pressure tank, including a gas pressure gauge for exteriorly monitoring the pressure existing therewithin and further including a gas valve mounted within the gas venting line to permit controlled release of gases.

21. The apparatus of claim 20, wherein the degassing means comprises:

(a) an impingement plate mounted within the inner pressure tank orthogonal to the incoming fluid, said incoming mixture being directed downwardly by the conduit and said inner pressure tank having a lower portion concentrically situated with respect to the incoming line and an upper portion of smaller diameter adapted to receive and contain the gas as separated from mixture upon impact with the impingement plate, said gas venting line communicating with the upper portion of the inner pressure tank.

22. The apparatus of claim 20, wherein hydrocyclone separator means comprises:

a hydrocyclone wherein the pressure within said inner pressure tank forces the mixture contained therewithin to enter the hydrocyclone along a tangential path so as to continue along a downwardly spiralling helical path within the main conical body of the hydrocyclone, said hydrocyclone having a first outlet port at the bottom thereof for disposal of separated solids from the mixture circulating therewithin and a second outlet located at the top connected to the outer tank.

23. The apparatus of claim 22, wherein the hydrocyclone separator means further comprises:

a valve controlling the outflow of solids from the hydrocyclone, said valve including a ball valve element adapted to sealingly engage the first outlet port of the hydrocyclone when in contact therewith, said ball valve element having a plurality of horizontally projecting pins mounted therein, said valve further including a plurality of inelastic hangers having first ends mounted on the hydrocyclone body and depending downwardly, said hangers further having second ends adapted to slidingly engage and encircle the horizontally projecting pins on the ball valve element, so as to allow vertical movement of the ball valve element between a closed position in contact with a hydrocyclone first outlet, and a lower, open position whereby egress of solds permitted, said ball valve element being induced upwardly to a closed position by the existance of a sub-atmospheric pressure within the hydrocyclone so as to prevent the intermixing of ambient gases with the fluids therewithin, said ball valve element further being permitted to fall into an open position under the influence of gravity by the presence of pressures equal to or greater than atmospheric within the hydrocyclone.

* * * * *